United States Patent Office 3,415,839
Patented Dec. 10, 1968

---

3,415,839
1,2-DISUBSTITUTED BENZIMIDAZOLE 3-OXIDES
John W. Schulenberg, Bethlehem, N.Y., assignor to Sterling Drug Inc., New York, N.Y., a corporation of Delaware
No Drawing. Continuation-in-part of application Ser. No. 404,952, Oct. 19, 1964. This application Oct. 21, 1966, Ser. No. 588,339
3 Claims. (Cl. 260—309.2)

---

ABSTRACT OF THE DISCLOSURE

1-R-2-R'-benzimidazole 3-oxides, where R and R' are lower-alkyl or phenyl, at least one of R and R' being phenyl, having hyperglycemic and tranquillizing activities, are prepared by hydrogenating the appropriate 2-nitroanilines substituted on nitrogen by the groups R and COR", where R" is lower-alkyl, phenyl, 1-chloro-lower-alkyl or 1,1-dichloro-lower-alkyl.

---

This application is a continuation-in-part of application Ser. No. 404,952, filed Oct. 19, 1964, now abandoned.

This invention relates to new heterocyclic compounds and in particular is concerned with 1,2-disubstituted-benzimidazole 3-oxides and the preparation thereof, including intermediates therein.

The compounds of the invention are of the following structure:

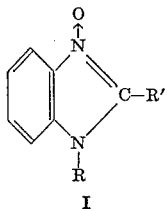

I wherein R and R' are lower-alkyl or phenyl, at least one of R and R' being phenyl. The lower-alkyl group preferably has from one to five carbon atoms.

The substitution of simple moieties on the benzene ring of the benzimidazole nucleus, and/or on the groups R and R' when they stand for phenyl does not adversely affect the pharmacological activity of the compounds and such substituted compounds are the full equivalents of the compositions herein claimed. Illustrative but not limitative examples of such simple moieties are lower-alkyl, lower-alkoxy and halo.

The compounds of the invention are prepared by catalytically hydrogenating a compound of the formula

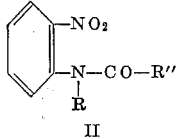

II wherein R is lower-alkyl or phenyl, and R" is lower-alkyl, 1-chloro-lower-alkyl, 1,1-dichloro-lower-alkyl or phenyl, at least one of R and R" being phenyl. Preferred catalysts are platinum oxide and palladium-on-carbon. The compounds of Formula II are in turn prepared by reacting a 2-nitro-N-(R)-aniline with the appropriate alkanoyl halide, R"-CO-X, where X is chlorine or bromine. Compounds bearing substitutents in the benzene rings are prepared by the same process.

A further aspect of the invention lies in novel intermediates of the formula

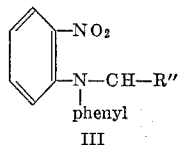

III wherein R" is 1-chloro-lower-alkyl or 1,1-dichloro-lower alkyl.

The structures of the compounds of the invention were established by elementary analysis, and by ultraviolet, infrared and nuclear magnetic resonance spectra, which showed the absence of a carbonyl group. Further structure proof was provided by the fact that the product derived from hydrogenation of N - chloro - acetyl - 2 - nitrodiphenylamine was not identical with another possible structure, 1 - phenylbenzimadazole - 2 - methanol, prepared by an alternative synthesis (cyclization of 2' - anilino - 2 - hydroxy - acetanilide).

Pharmacological evaluation has shown that the compounds of Formula I possess hyperglycemic and psychomotor depressant properties thus indicating their usefulness in regulating the blood sugar content and as tranquillizers.

The compounds of Formula I are useful both in free base form and in acid-addition salt form, and both forms are within the purview of the invention and are considered to be one and the same invention.

The following examples will further illustrate the invention.

EXAMPLE 1

(a) N-chloroacetyl-2-nitrodiphenylamine
[III; R" is CH₂Cl]

A mixture of 64.2 g. (0.3 mole) of 2-nitrodiphenylamine, 67.5 g. (45 ml., 0.6 mole) of chloroacetyl chloride and 100 ml. of toluene was refluxed for four and three-quarters hours. The toluene was removed in vacuo and the residue recrystallized from ethanol to give 74.5 g. of N-chloroacetyl-2-nitrodiphenylamine, yellow prisms, M.P. 122–124° C. (uncorr.); ultraviolet maximum at 232 m$\mu$ ($\epsilon$=16,300); infrared absorption peak at 5.91 $\mu$.

N - chloroacetyl - 2 - nitrodiphenylamine when administered intraperitoneally to mice at a dose level of 100 mg./kg. showed an 82% decrease in spontaneous activity.

By replacing the chloroacetyl chloride in the preceding preparation by a molar equivalent amount of $\alpha$-chloropropionyl chloride, $\alpha$-chloroisobutyryl chloride or $\alpha$-chlorocaproyl chloride, there can be obtained, respectively, N-($\alpha$-chloropropionyl)-2-nitrodiphenylamine, N - ($\alpha$ - chloroisobutyryl) - 2 - nitrodiphenylamine, or N - ($\alpha$ - chlorocaproyl) - 2 - nitrodiphenylamine.

By replacing the 2-nitrodiphenylamine in the preceding preparation by a molar equivalent amount of 2-nitro-4'-methyl-diphenylamine, there can be obtained N-chloroacetyl-2-nitro-4'-methyldiphenylamine.

(b) 1 - phenyl - 2 - methylbenzimidazole 3 - oxide [I; R is C₆H₅, R' is CH₃]

A solution of 14.55 g. (0.05 mole) of N-chloroacetyl-2-nitrodiphenylamine in 225 ml. of absolute ethanol was hydrogenated at room temperature in the presence of 200 mg. of platinum oxide. After one hour the requisite three molar equivalents of hydrogen had been absorbed, and the hydrogenation was terminated and the mixture filtered. The hydrogenation was repeated starting with 13.0 g. of N-chloroacetyl-2-nitrodiphenylamine, and the two runs were combined and concentrated to a small volume. The product was crystallized from acetone containing a little absolute ether to give 17.0 g. of 1-phenyl-2-methylbenzimidazole 3-oxide in the form of its hydrochloride salt, prisms, M.P. 212.0–213.6° C. (dec.) (corr.); ultraviolet maxima at 249, 272 and 279 mμ (ε=6080, 7300 and 7700, respectively), and shoulder at 289 mμ; infrared absorption peaks at 3.30, 4.50, 6.22, 6.28, 6.60, 6.71, 6.85, 7.34, 7.57, 7.98 and 8.17μ.

*Analysis.*—Calcd. for $C_{14}H_{12}N_2O \cdot HCl$: C, 64.49; H, 5.02; N, 10.75. Found: C, 64.79; H, 4.99; N, 10.61.

1-phenyl-2-methylbenzimidazole 3-oxide was also obtained when N-chloroacetyl-2-nitrodiphenylamine was hydrogenated in the presence of palladium-on-carbon catalyst instead of platinum oxide catalyst.

A sample of the hydrochloride salt was dissolved in water, excess potassium bicarbonate added, and the base extracted with chloroform. The chloroform extracts were washed with water, dried and concentrated, and the residue recrystallized from ethyl acetate to give 1-phenyl-2-methylbenzimidazole 3-oxide in the form of colorless prisms, M.P. 159–167° C. (uncorr.); infrared absorption peaks at 3.32, 6.28, 6.64, 6.83, 7.35, 7.70, 8.03 and 8.24μ.

*Analysis.*—Calcd. for $C_{14}H_{12}N_2O$: C, 74.99; H, 5.38; N, 12.49. Found: C, 75.42; H, 5.14; N, 12.39.

By replacing the N-chloroacetyl-2-nitrodiphenylamine in preparation (b) above by a molar equivalent amount of N-(α-chloropropionyl)-2-nitrodiphenylamine, N-(α-chloroisobutyryl)-2-nitrodiphenylamine, N-(α-chlorocaproyl)-2-nitrodiphenylamine, or N-chloroacetyl-2-nitro-4'-methyldiphenylamine, there can be prepared, respectively, 1-phenyl-2-ethylbenzimidazole 3-oxide, 1-phenyl-2-isopropylbenzimidazole 3-oxide, 1-phenyl-2-pentylbenzimidazole 3-oxide, or 1-(p-tolyl)-2-methylbenzimidazole 3-oxide.

1-phenyl-2-methylbenzimidazole 3-oxide in the form of its hydrochloride salt when administered at 100 mg./kg. orally to fasted male rats caused a 49% increase in the blood glucose level.

(c) 1-phenylbenzimidazole-2-methanol

A mixture of 5.9 g. (0.024 mole) of 2'-anilino-2-hydroxyacetanile (M.P. 143–150° C.) (prepared from N-phenyl-o-phenylenediamine and glycolic acid), 5 g. (0.026 mole) of p-toluene sulfonic acid hydrate and 250 ml. of toluene was slowly distilled over a three-hour period. The reaction mixture was cooled, aqueous sodium hydroxide added and the freed base extracted with ether. Solvent removal left a brown solid which was recrystallized to give 4.3 g. of 1-phenylbenzimidazole-2-methanol, M.P. 131.4–132.4° C. (corr.).

*Analysis.*—Calcd. for $C_{14}H_{12}N_2O$: N, 12.49. Found: N, 12.38.

Ethanolic hydrogen chloride was added to a solution of 1-phenylbenzimidazole-2-methanol in acetone. The solid which separated was collected and recrystallized from an isopropyl alcohol-acetone mixture to give 1-phenylbenzimidazole-2-methanol in the form of its hydrochloride salt, colorless needles, M.P. 192–197° C. (corr.). A mixture melting point with the hydrochloride salt of 1-phenyl-2-methylbenzimidazole 3-oxide showed a marked depression.

*Analysis.*—Calcd. for $C_{14}H_{13}ClN_2O$: N, 10.75. Found: N, 10.53.

1-phenylbenzimidazole-2-methanol was found to be bacteriostatic in vitro against *Cl. welchii* at a concentration of 0.002 mg. per ml.

EXAMPLE 2

(a) N-(2,2-dichloroacetyl)-2-nitrodiphenylamine [III; R″ is CHCl₂]

A solution of 21.4 g. (0.1 mole) of o-nitrodiphenylamine and 29.5 g. (0.2 mole) of dichloroacetyl chloride in 30 ml. of toluene was refluxed for 24 hours. Ethanol was then added and the mixture cooled to furnish 22.8 g. of solid, M.P. 143–145° C. The latter was recrystallized three times from absolute ethanol to give 10.5 g. of N-(2,2-dichloroacetyl)-2-nitrodiphenylamine, tan solid, M.P. 152–154° C.

*Analysis.*—Calcd. for $C_{14}H_{10}Cl_2N_2O_2$: C, 51.71; H, 3.10; N, 8.61. Found: C, 51.80; H, 3.25; N, 8.79.

(b) N-(2,2-dichloroacetyl)-2-nitrodiphenylamine was hydrogenated according to the procedure of Example 1, part (b) to give a 57% yield of 1-phenyl-2-methylbenzimidazole in the form of its hydrochloric salt, M.P. 201–205° C., identical with the product of Example 1, part (b).

EXAMPLE 3

1,2-diphenylbenzimidazole 3-oxide [I; R and R′ are C₆H₅]

N-benzoyl-2-nitrodiphenylamine (10.29 g.) in 100 ml. of absolute ethanol containing 0.034 mole of hydrogen chloride was hydrogenated in the presence of 100 mg. of platinum oxide. After the uptake of hydrogen had ceased, the reaction mixture was filtered and the filtrate concentrated to remove the solvent. The residue was recrystallized from isopropyl alcohol to give 7.84 g. of 1,2-diphenylbenzimidazole 3-oxide in the form of its hydrochloride salt, light pink solid, M.P. 253–254° C. (dec.). A sample of the hydrochloride salt was treated with alkali to give the free base, M.P. 192–195° C. (dec.) when recrystallized from ethyl acetate.

*Analysis.*—Calcd. for $C_{19}H_{14}N_2O$: C, 79.71; H, 4.93; N, 9.79. Found: C, 79.98; H, 5.38; N, 9.79.

Similarly, N-(p-methoxybenzoyl)-2-nitrodiphenylamine can be hydrogenated to produce 1-phenyl-2-(p-methoxyphenyl)-benzimidazole 3-oxide.

EXAMPLE 4

1-methyl-2-phenylbenzimidazole 3-oxide [I; R is CH₃, R′ is C₆H₅] was prepared by hydrogenating N-benzoyl-N-methyl-2-nitroaniline according to the procedure of Example 3, and was obtained in the form of its hydrochloride salt, M.P. 248–250.5° C. (dec.) when recrystallized from absolute ethanol.

*Analysis.*—Calcd. for $C_9H_{10}N_2 \cdot HCl$: C, 59.17; H, 6.07; N, 15.34. Found: C, 58.95; H, 6.08; N, 14.77.

I claim:
1. A compound of the formula

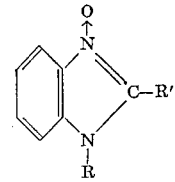

wherein R is phenyl and R′ is lower-alkyl or phenyl.

2. 1-phenyl-2-methylbenzimidazole 3-oxide, according to claim 1, wherein R is phenyl and R′ is methyl.

3. 1,2-diphenylbenzimidazole 3-oxide, according to claim 1, wherein R and R′ are phenyl.

References Cited

Netherlands application 6,510,290, Feb. 8, 1966, pp. 1, 3–13 relied on 260–309.2.

Stacy et al. Jour. Heter. Chem. vol. 3, pp. 51–54 (1966, March).

Hayashi et al., Jour, Pharm. Soc., Japan vol. 82, pp. 1093–1102 (1962).

Wright Chem. Rev., vol. 48, pp. 458–62 (1951).

Hofmann Imidazole and Its Derivatives, Part I, pp. 284–5 and 381, N.Y. Interscience, 1953.

Jerchel et al.: Chem. Abst. vol. 47, columns 2752–3 (1953).

Takahashi et al.: Chem. & Pharm. Bul. vol. 11, pp. 1375–81 (November 1963).

HENRY R. JILES, *Primary Examiner.*

NATALIE TROUSOF, *Assistant Examiner.*

U.S. Cl. X.R.

167—65; 260—558, 562

UNITED STATES PATENT OFFICE
CERTIFICATE OF CORRECTION

Patent No. 3,415,839 December 10, 196

John W. Schulenberg

It is certified that error appears in the above identified patent and that said Letters Patent are hereby corrected as shown below:

Column 2, lines 1 to 6, the formula should appear as shown below:

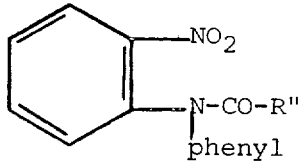

same column 2, line 16, "1-phenylbenzimadazole-" should read -- 1-phenyl-benzimidazole- --. Column 3, line 39, "droxyacetanile" should read -- droxyacetanilide --.

Signed and sealed this 17th day of March 1970.

(SEAL)
ATTEST:

Attesting Officer
EDWARD M. FLETCHER, JR.

WILLIAM E. SCHUYLER, JR.
Commissioner of Patents